May 25, 1965 O. M. KING 3,185,347
DRY CHEMICAL FEEDER
Filed Aug. 28, 1963 3 Sheets-Sheet 1
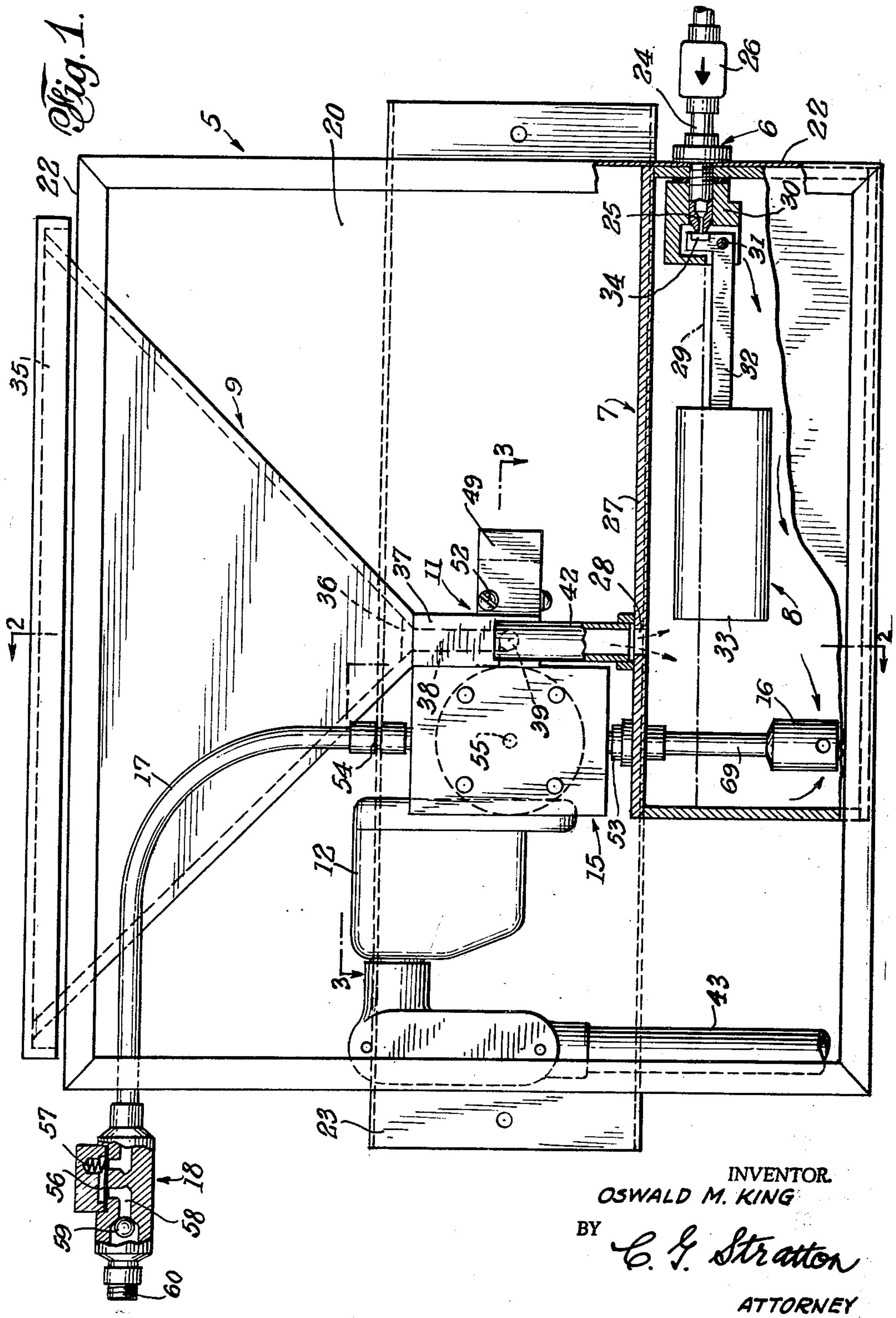
INVENTOR.
OSWALD M. KING
BY C. G. Stratton
ATTORNEY

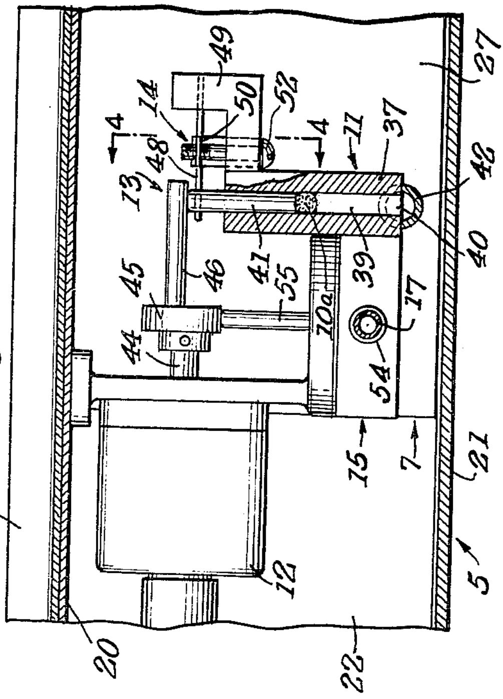
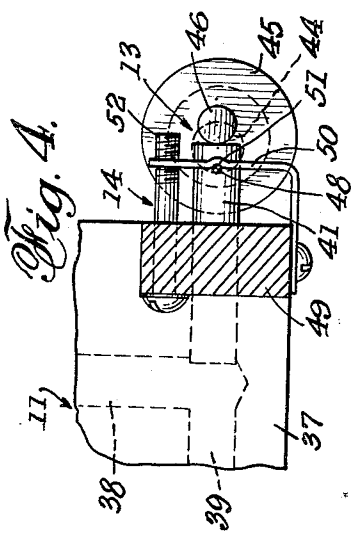
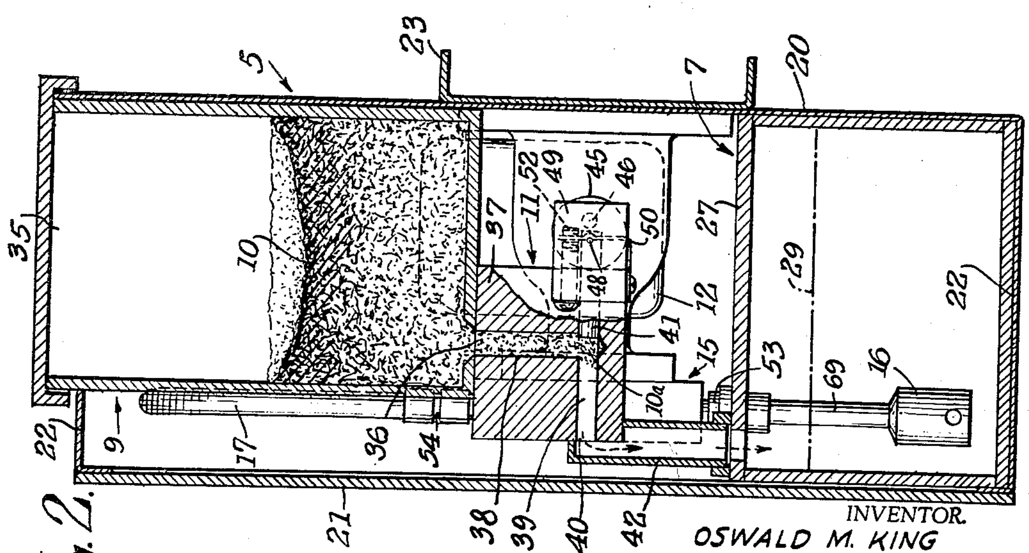
INVENTOR.
OSWALD M. KING
BY C. G. Stratton
ATTORNEY DRY CHEMICAL FEEDER
Filed Aug. 28, 1963
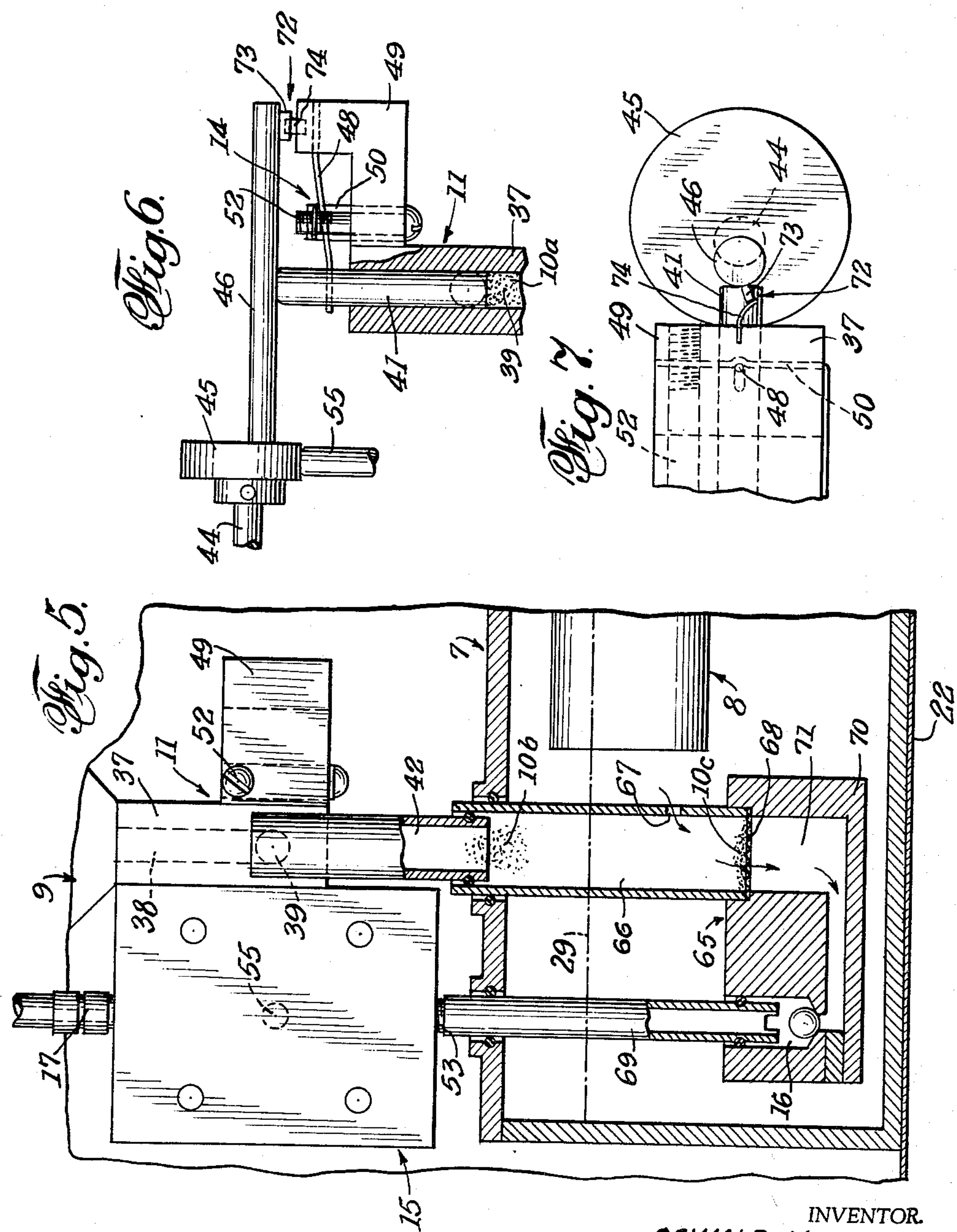
INVENTOR.
OSWALD M. KING
BY C. G. Stratton
ATTORNEY United States Patent Office 3,185,347
Patented May 25, 1965

3,185,347
DRY CHEMICAL FEEDER

Oswald M. King, Los Angeles, Calif., assignor to Blue White Industries, Ltd., Santa Monica, Calif., a corporation of California Filed Aug. 28, 1963, Ser. No. 305,116
5 Claims. (Cl. 222—67)

This invention relates to a device for feeding dry chemicals to a body of water, such as the water of a swimming pool.

An object of the present invention is to provide a dry chemical feeder that automatically feeds a regulated quantity of material in a continuous manner for incorporation into a liquid flow to such body of water.

Another object of the invention is to provide a feeder as above characterized that operates independently of differences of level between the feeder and the body of water being supplied with the material.

A further object of the invention is to provide a feeder that requires only that the rate of feed or incorporation of the dry material into the flow be regulated as desired, it not being necessary to regulate the liquid flow, therefor.

A still further object of the invention is to provide a dry feeder that has a positive displacement intermittent action that minimizes free flow or gravity feed of material from a supply thereof.

A still further object of the invention is to provide a dry chemical feeder in which the flow of chemicals is maintained against compacting.

A yet further object of the invention is to provide a device of the character referred to in which an outlet flow of liquid is drawn through a quantity of chemical introduced in the path of such flow, thereby insuring that the device will deliver only a flow of chemically treated liquid.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawings. However, said drawings merely show, and the following description merely describes one embodiment of the present invention, which is given by way of illustration or example only.

In the drawings, like reference characters designate similar parts in the several views.

FIG. 1 is a front elevational view of a dry feeder for chemicals and the like, showing a preferred form of the invention, portions being shown in cross-section.

FIG. 2 is a vertical sectional view as taken on the line 2—2 of FIG. 1.

FIG. 3 is a fragmentary plan sectional view as taken on the line 3—3 of FIG. 1.

FIG. 4 is an enlarged vertical sectional view as taken on the line 4—4 of FIG. 3.

FIG. 5 is a broken partial front elevational and partial sectional view of a modification.

FIG. 6 is an enlarged view similar to FIG. 3 of means to provide the device with material-loosening vibration.

FIG. 7 is an enlarged end elevational view thereof.

The present dry feeder comprises generally, a housing 5, a water inlet 6 from any source and preferably from a body of water being supplied with the material that is fed by the feeder, a tank or mixing chamber 7 within said housing and receptive of flow from the inlet under control of a float means 8, a hopper 9 for comminuted dry or crystalline material 10, material-flow and -discharge means 11 receiving material from said hopper and discharging the same into the tank 7 to be incorporated in the liquid in said tank, an electric motor 12, means 13 driven by said motor to operate the means 11, means 14 to regulate said operation, a positive-displacement pump 15, a foot valve 16 in said tank 7 and connected to the inlet of pump 15 for passing material-provided liquid from said tank and checking return flow, a discharge line 17 connected to the outlet of the pump, and an anti-siphon valve 18 on the end of line 17 and discharging to the body of liquid being treated by the material 10.

The housing 5 is shown as a rectangular box-like enclosure having a back wall 20, a removable front cover 21 and upper, lower and side walls 22. Said housing is shown with a channel member 23 affixed to the back wall and affording means by which the housing may be fixedly held in operative position.

The water inlet 6 comprises a pipe 24 from a swimming pool or other source, terminating in a nozzle 25, and provided with a check valve 26 that prevents back flow toward the source. Said nozzle extends through one of the side walls 22 and discharges into the tank 7.

Said tank is shown as a rectangular enclosure disposed in the lower portion of the housing, the same having a top cover or wall 27 in which an inlet opening 28 is provided for dry chemical material as herein contemplated, said material becoming dissolved in the water or liquid discharged into the tank from the nozzle 25.

The float means 8 is provided for maintaining a maximum level 29 in the tank 7. Said means is shown as a fitting 30 on the nozzle 25, a transverse pivot 31 provided on said fitting for mounting a float lever 32 that is provided with a float 33 and is provided with a valve portion 34 that controls flow from the nozzle 25. At maximum level 29, the nozzle 25 is closed by the valve 34, the float dropping under lower level conditions to open the nozzle, accordingly.

The hopper 9 is disposed in the upper portion of the housing 5 with its upper open end 35 extending above the top housing wall 22. The hopper is tapered toward its bottom outlet 36 which gravitationally discharges the dry material 10 into the material-flow and -discharge means 11.

Said means 11 is shown as a body 37 which is provided with a vertical passage 38 that receives material from the hopper outlet 36, and a transverse passage 39 into which the passage 38 drops said material. The passage 39 is a through passage that intersects the passage 38 and it will be clear that material 10 can have but a limited discharge into the passage 39 which becomes blocked until material falling thereinto is displaced toward its open end 40.

Said means 11 further comprises a plunger 41 that is loosely fitted in the portion of passage 39 that is opposite to the open end 40 thereof. The material displaced by reciprocations of said plunger enters a vertical discharge tube 42 in which the same falls free to and through the tank inlet opening 28.

The electric motor 12 is supplied by current conducted thereto through a conduit 43. Said motor has an operating shaft 44.

The means 13 is driven by said shaft on which is mounted an eccentric cam 45 from which extends a cam rod 46 which moves around the axis of shaft 44, thereby alternately pressing against and releasing the outer end of the plunger 41. During such release of the plunger, a wire spring 48 retracts the plunger due to its becoming flexed during plunger projection. Said spring 48 has one end affixed in an extension 49 of the body 37 and its other end extending through the plunger 41 near the end of said plunger that is engaged by the rod 46. Thus, the rod is held resiliently by the spring 48 which normally seeks a retracted position after being projected by said rod. The resulting reciprocations of the rod cause an intermittent feed of material 10 in the passage 39 toward and into the discharge tube 42.

The means 14 for regulating the operation of the means 11 and, particularly, regulating the stroke of the plunger 41, is shown as a flat spring 50 that has engagement, at 51, with the spring 48, and an adjusting screw 52 that is mounted in the body extension 49 and has threaded engagement with the free end of the spring 50. Since the longest stroke of the plunger 41 is obtained with the same in full and continuous contact with the cam rod 46, a shorter stroke may be obtained by regulating the screw 52 so the spring 48 will limit the return flexure of the wire spring 48. Thus, the rate of material feed may be changed and set by regulation of the screw 52.

The pump 15 is preferably of the positive displacement type with an inlet 53 to which the foot valve 16 is connected, and an outlet 54 from which the discharge line 17 extends. This pump employs a diaphragm for creating flow therethrough, the same being exemplified by an actuator 55 that is reciprocated by the eccentric cam 45 as the motor shaft rotates. Thus, the motor has the two-fold purpose of operating the pump 15 and reciprocating the plunger 41 to feed material to the tank or mixing chamber 7.

It will be understood that liquid from chamber 7 is drawn therefrom through the foot valve 16, forced into the line 17 into the anti-siphon check valve 18 where said liquid displaces a diaphragm 56 against the bias of a spring 57, into a chamber 58 and past a ball check 59 to the outlet 60 of said valve 18. This discharge, in any suitable manner, is directed to the tank, pool or other place where the chemically treated flow is desired. It will be seen that the spring 57 prevents forward flow to the line 60.

FIG. 5 shows the above-described device as provided with means 65 that insures that the outlet flow from chamber 7 will be chemically treated by the dry chemical 10 and that the treatment will be quite uniformly effected.

Calcium hypochlorite, a commercial product usually containing seventy to seventy-five percent available chlorine, is useful as a bactericide for swimming pools. Assuming that crystalline product is the material 10, the plunger 41 will displace successive batches 10*a* thereof (FIG. 6) along the passage 39, and the same will fall gravitationally, as at 10*b* (FIG. 6) through the tube 42. This discharge of material will become dispersed over the top of the liquid in chamber 7 but, since the liquid leaves said chamber through the foot valve 16, near the bottom, some of the discharge may not become properly chlorinated.

According to FIG. 5, a tube 66 is provided as an extension of the tube 42 and extends into the liquid or water in said chamber 7. One or more small orifices 67 are provided in the immersed lower end of tube 66, and a foraminous member 68 is placed across the lower end of said tube. It will be clear that the material falling into tube 66 will fall upon the member 68, as at 10*c* and in this intercepted position will release its available chlorine in the liquid within said tube 66.

The foot valve 16, being open under suction imposed by the pump 15, the liquid or water in tank 7 is drawn through the orifices 67 and through the chemicals at 10*c* and upwardly in the tube 69 to the pump outlet 53. As a consequence, only chemically treated water will be discharged to the outlet 60. The above arrangement confines all or most of the water chlorination to the tube 66, and the body 70 that has a passage 71 connecting this tube and the foot valve.

For one reason or another the material may become compacted in the hopper and clog the outlet 36. FIGS. 6 and 7 showing means 72 for obviating such a condition. The same is shown as a lug 73 on the cam rod 46 and a leaf spring 74 extending from the body extension 49. The latter is flexed by the former and suddenly released during each rotation of shaft 44. Said spring 74 is released with a snap action that jars or vibrates the body 37 and, therefore, the discharge end of the hopper 9 to loosen the material therein.

The above-described means provides a simple and effective manner of metering a regulated quantity of dry material continuously to a liquid flow line irrespective of the pressures at the inlet 24 and outlet 60.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A dry chemical feeder comprising:
(*a*) a mixing chamber provided with a liquid inlet and means for maintaining a maximum liquid level therein,
(*b*) a hopper for dry, comminuted chemical material,
(*c*) means to receive material from the hopper by gravitational flow and for displacing the material so received to a gravity discharge offset from said material flow and into the liquid in said mixing chamber,
(*d*) means to pump the chemically treated liquid from the chamber,
(*e*) a single operating motor having a drive shaft,
(*f*) a cam on said shaft to operate the pump at a constant rate,
(*g*) a reciprocative plunger for displacing the material to the mentioned gravity discharge,
(*h*) a member on the motor shaft to project the plunger in a material-displacing direction, and
(*i*) spring means for returning the plunger to retracted position alternately with each plunger projection.

2. A dry chemical feeder according to claim 1 in which means is provided to regulate the stroke of the plunger to, thereby regulate the feed of dry material.

3. A dry chemical feeder according to claim 2 the last-mentioned means comprising a flexible member in the path of return movement of the plunger under bias of its return spring, and a regulating screw to flex said flexible member in either direction to increase or decrease the return-stroke movement of the plunger, accordingly.

4. A dry chemical feeder comprising:
(*a*) a mixing chamber provided with a liquid inlet and means for maintaining a maximum liquid level therein,
(*b*) a hopper for dry, comminuted chemical material,
(*c*) means to receive material from the hopper by gravitational flow and motor means for displacing the material so received to a gravity discharge offset from said material flow and into the liquid in said mixing chamber, and
(*d*) said motor means also being connected to pump the chemically treated liquid from the chamber.

5. A dry chemical feeder comprising:
(*a*) a mixing chamber provided with a liquid inlet and means for maintaining a maximum liquid level therein,
(*b*) a hopper for dry, comminuted chemical material,
(*c*) means to receive material from the hopper by gravitational flow and for displacing the material so received to a gravity discharge offset from said material flow and into the liquid in said mixing chamber,
(*d*) a tube partly immersed in the liquid of the mixing chamber and into which the displaced material is discharged, (*e*) said tube having an orifice through which liquid in the chamber flows to the bottom of the tube, (*f*) means to pump the liquid chemically treated by the material entering the tube from the bottom of said tube, and (*g*) a foraminous member interposed in the flow of liquid from said tube, said member intercepting material dropping gravitationally in the tube, and the liquid entering the tube from the mixing chamber being drawn through such material during pumping of the liquid.

References Cited by the Examiner

UNITED STATES PATENTS

| | | | |
|---|---|---|---|
| 2,667,990 | 2/54 | Mojonnier | 222—70 X |
| 2,726,792 | 12/55 | Seymour | 222—333 X |
| 3,010,615 | 11/61 | Smith et al. | 222—333 X |
| 3,023,936 | 3/62 | Marsh et al. | 222—309 X |
| 3,084,047 | 4/63 | Holstein et al. | 222—67 X |
| 3,123,256 | 3/64 | Smith et al. | 222—333 X |

LOUIS J. DEMBO, *Primary Examiner.*

HADD S. LANE, *Examiner.*